United States Patent [19]

Brown

[11] Patent Number: 5,394,309

[45] Date of Patent: Feb. 28, 1995

[54] SUBMERSIBLE DEVICE FOR CHANGING COLORS IN AN AQUARIUM

[76] Inventor: Joseph R. Brown, 10410 Moody Ave., Apt. B.N., Chicago Ridge, Ill. 60415

[21] Appl. No.: 239,571

[22] Filed: May 9, 1994

[51] Int. Cl.⁶ .............................................. F21Y 9/10
[52] U.S. Cl. ..................................... 362/35; 362/101; 362/806
[58] Field of Search ................. 362/35, 101, 806, 871

[56] References Cited

U.S. PATENT DOCUMENTS

| | | | |
|---|---|---|---|
| 2,943,185 | 6/1960 | DeMott | 362/901 |
| 3,080,474 | 3/1963 | Allen | 362/811 |
| 3,104,815 | 9/1963 | Schultz | 362/35 |
| 3,326,185 | 6/1967 | Perez | 362/101 |
| 3,755,664 | 8/1973 | Reiback | 362/811 |
| 4,747,022 | 5/1988 | Lin | 362/806 |
| 5,067,059 | 11/1991 | Hwang | 362/101 |

*Primary Examiner*—Richard R. Cole

[57] ABSTRACT

A submersible device for changing colors in an aquarium comprising of a base member of a rigid construction and heavy weighted material to allow placement in the bottom of an aquarium. A housing having a lower surface coupled to the base with upstanding sidewalls and a cover piece with a dome-like top formed with clear transparent windows therethrough to define a chamber therewithin, the chamber including an upwardly extending post at a central extent thereof coaxial with the axis of top. A driven gear having a circular extent in a horizontal plane within the chamber and having teeth around the periphery thereof, the gear being mounted on the post for rotation with respect thereto. A submersible motor mounted within the chamber having a drive-gear rotatable about a vertical axis with teeth in contact with the teeth of the driven gear for rotating and imparting rotation to the driven gear. A fixed light source mounted within the chamber above the post. A domed member mounted above and to the driven gear for rotation therewith at a location above the light source, the domed member being provided with a plurality of transparent plates of varying colors.

4 Claims, 3 Drawing Sheets

SUBMERSIBLE DEVICE FOR CHANGING COLORS IN AN AQUARIUM

BACKGROUND OF THE INVENTION

1. Field of the Invention

The present invention relates to a submersible device for changing colors in an aquarium and more particularly pertains to changing the color and appearance of things in an aquarium through a light and rotating filters.

2. Description of the Prior Art

The use of illumination devices with color filters and aquarium lights is known in the prior art. More specifically, illumination devices and color filters and aquarium lights heretofore devised and utilized for the purpose of illuminating things for varying the illumination characteristics are known to consist basically of familiar, expected, and obvious structural configurations, notwithstanding the myriad of designs encompassed by the crowded prior art which has been developed for the fulfillment of countless objectives and requirements.

By way of example, the prior art in U.S. Pat. No. 5,067,060 to Sieracki discloses an aquarium lamp.

U.S. Pat. No. 4,369,216 to Willinger discloses an artificial aquarium plant.

U.S. Pat. No. 4,185,743 to Willinger discloses an artificial aquarium plant, anchor and container therefor.

U.S. Pat. No. 4,026,243 to Jessop discloses aquariums.

U.S. Pat. No. 3,682,753 to Willinger discloses an artificial aquarium plant simulating a natural plant.

In this respect, the submersible device for changing colors in an aquarium according to the present invention substantially departs from the conventional concepts and designs of the prior art, and in doing so provides an apparatus primarily developed for the purpose of changing the color appearance of things in an aquarium through a light and rotating filters.

Therefore, it can be appreciated that there exists a continuing need for new and improved submersible device for changing colors in an aquarium which can be used for changing the color appearance of things in an aquarium through a light and rotating filters. In this regard, the present invention substantially fulfills this need.

SUMMARY OF THE INVENTION

In view of the foregoing disadvantages inherent in the known types of illumination devices and color filters and aquarium lights now present in the prior art, the present invention provides an improved submersible device for changing colors in an aquarium. As such, the general purpose of the present invention, which will be described subsequently in greater detail, is to provide a new and improved submersible device for changing colors in an aquarium and method which has all the advantages of the prior art and none of the disadvantages.

To attain this, the present invention essentially comprises a submersible device for changing colors in an aquarium comprising, in combination, a base member of a rigid construction and heavy weighted material to allow placement in the bottom of an aquarium. A housing having a lower surface coupled to the base with upstanding sidewalls and a cover piece with a dome-like top formed with clear transparent windows therethrough to define a chamber therewithin, the chamber including an upwardly extending post at a central extent thereof coaxial with the axis of the top. A driven gear having a circular extent in a horizontal plane within the chamber and having teeth around the periphery thereof, the gear being mounted on the post for rotation with respect thereto. A submersible motor mounted within the chamber having a drive gear rotatable about a vertical axis with teeth in contact with the teeth of the driven gear for rotating and imparting rotation to the driven gear. A fixed light source mounted within the chamber above the post. A domed member mounted above and to the driven gear for rotation therewith at a location above the light source, the domed member being provided with a plurality of transparent plates of varying colors and with a reflector mounted for rotation with the driven gear beneath the light source. Electrical lines extending through one upstanding sidewall having interior ends coupled to the motor and the light source and an exterior end coupled to a source of potential with a control member therebetween, the control member including a rotary switch for the lights and a rotary switch for the motor.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved submersible device for changing colors in an aquarium which have all the advantages of the prior art illumination devices with color filters and aquarium lights and none of the disadvantages.

It is another object of the present invention to provide new and improved submersible device for changing colors in an aquarium which may be easily and efficiently manufactured and marketed.

It is further object of the present invention to provide new and improved submersible device for changing colors in an aquarium which are of durable and reliable constructions.

An even further object of the present invention is to provide new and improved submersible device for changing colors in an aquarium which are susceptible of a low cost of manufacture with regard to both materials and labor, and which accordingly are then susceptible of low prices of sale to the consuming public, thereby making such submersible device for changing colors in an aquarium economically available to the buying public.

Still yet another object of the present invention is to provide new and improved submersible device for changing colors in an aquarium which provide in the apparatuses and methods of the prior art some of the advantages thereof, while simultaneously overcoming some of the disadvantages normally associated therewith.

Still another object of the present invention is to change the color appearance of things in an aquarium through a light and rotating filters.

Lastly, it is an object of the present invention to provide new and improved submersible device for changing colors in an aquarium comprising of a base member of a rigid construction and heavy weighted material to allow placement in the bottom of an aquarium. A housing having a lower surface coupled to the base with upstanding sidewalls and a cover piece with a dome-like top formed with clear transparent windows therethrough to define a chamber therewithin, the chamber including an upwardly extending post at a central extent thereof coaxial with the axis of the top. A driven gear having a circular extent in a horizontal plane within the chamber and having teeth around the periphery thereof, the gear being mounted on the post for rotation with respect thereto. A submersible motor mounted within the chamber having a drive gear rotatable about a vertical axis with teeth in contact with the teeth of the driven gear for rotating and imparting rotation to the driven gear. A fixed light source mounted within the chamber above the post. A domed member mounted above and to the driven gear for rotation therewith at a location above the light source, the domed member being provided with a plurality of transparent plates of varying colors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
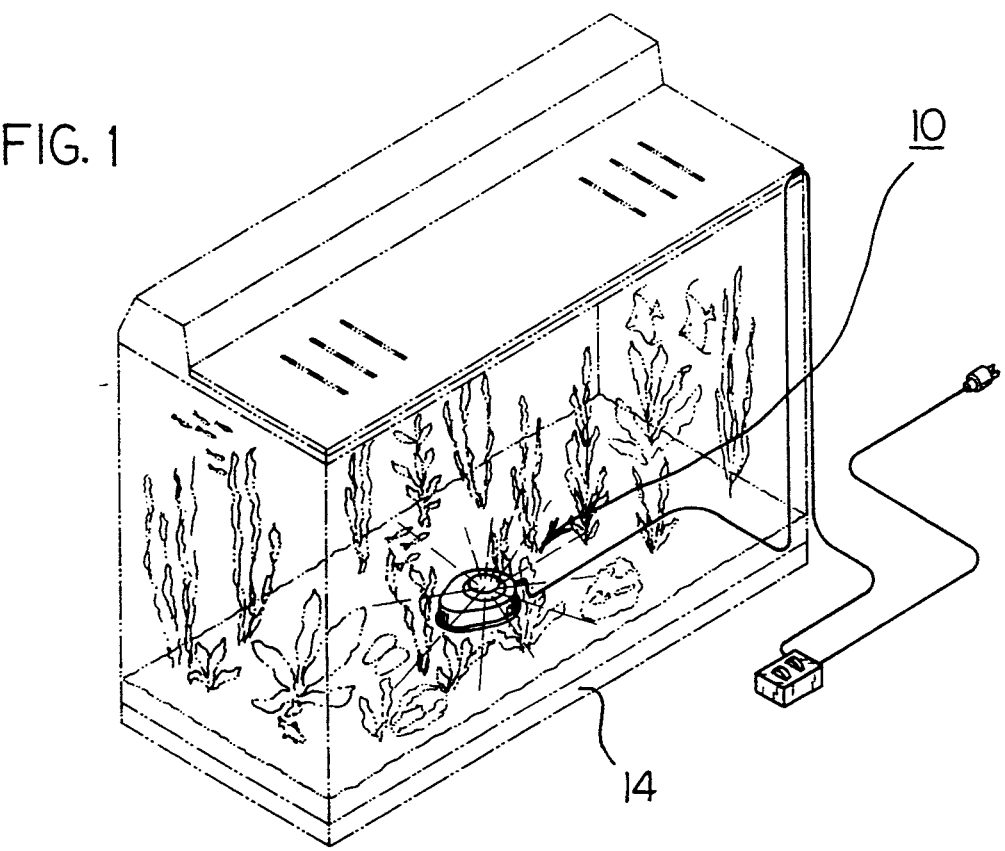
FIG. 1 is a perspective illustration of the preferred embodiment of the new and improved submersible device for changing colors in an aquarium constructed in accordance with the principles of the present invention.
Figure 2:
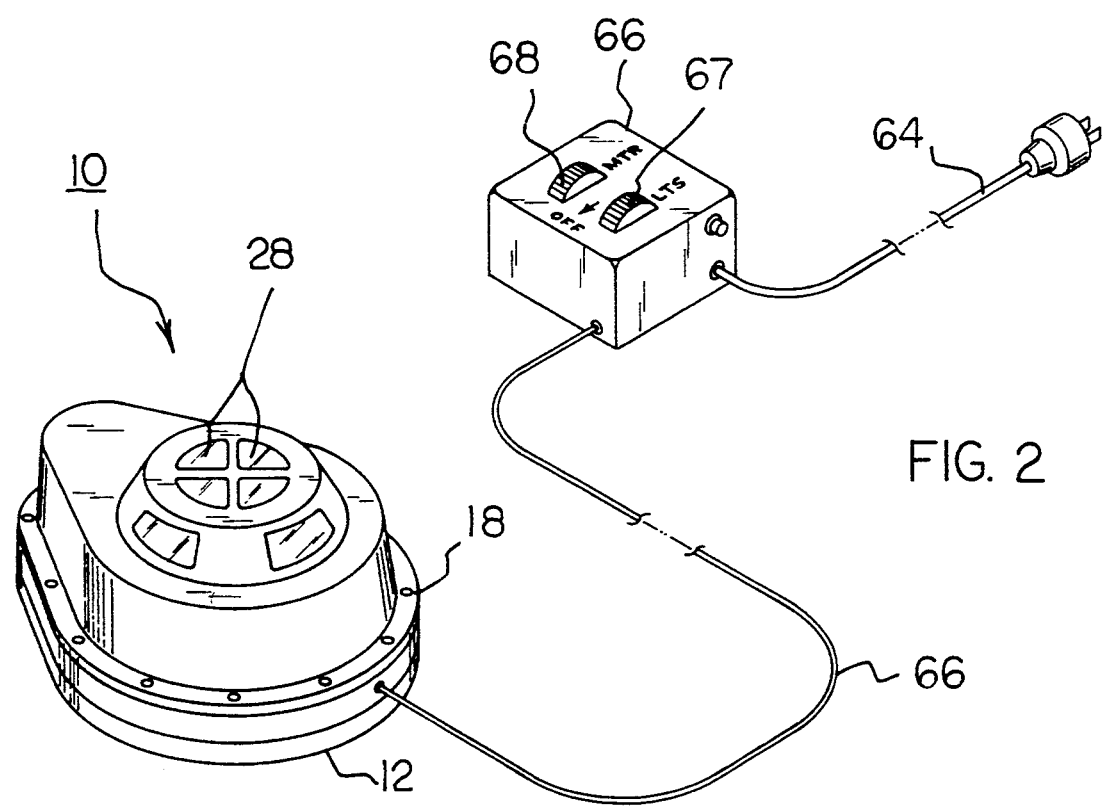
FIG. 2 is a perspective illustration of the illumination device and control mechanisms illustrated in FIG. 1.
Figure 3:
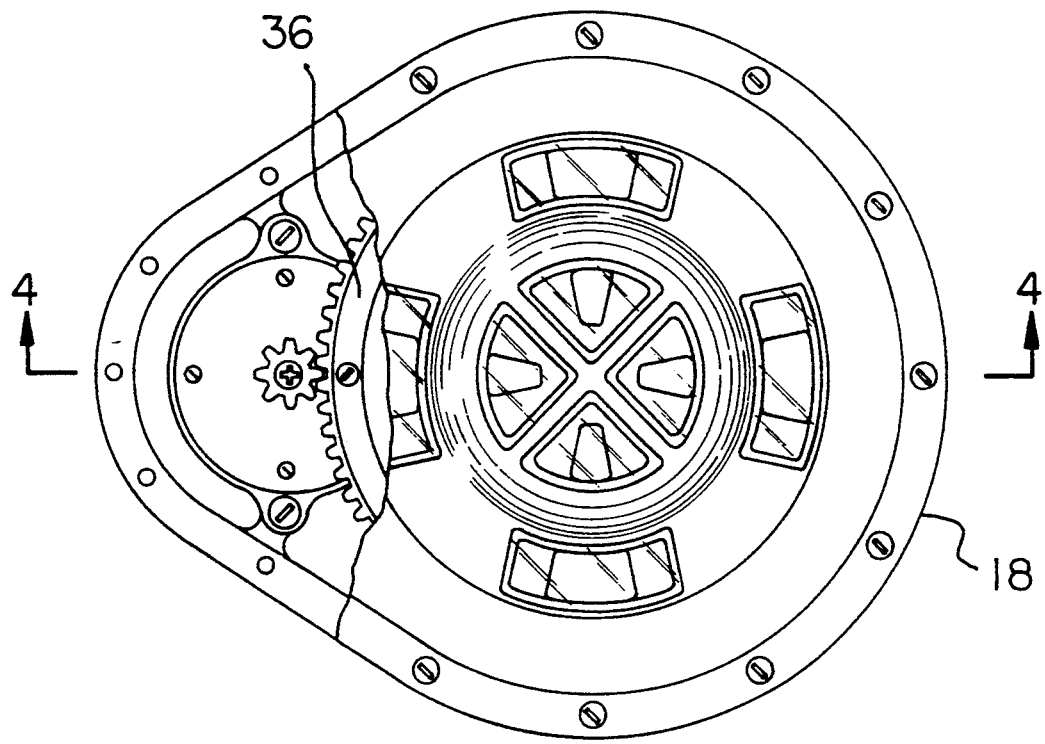
FIG. 3 is a top elevational view partly in section of the device shown in FIGS. 1 and 2.
Figure 4:
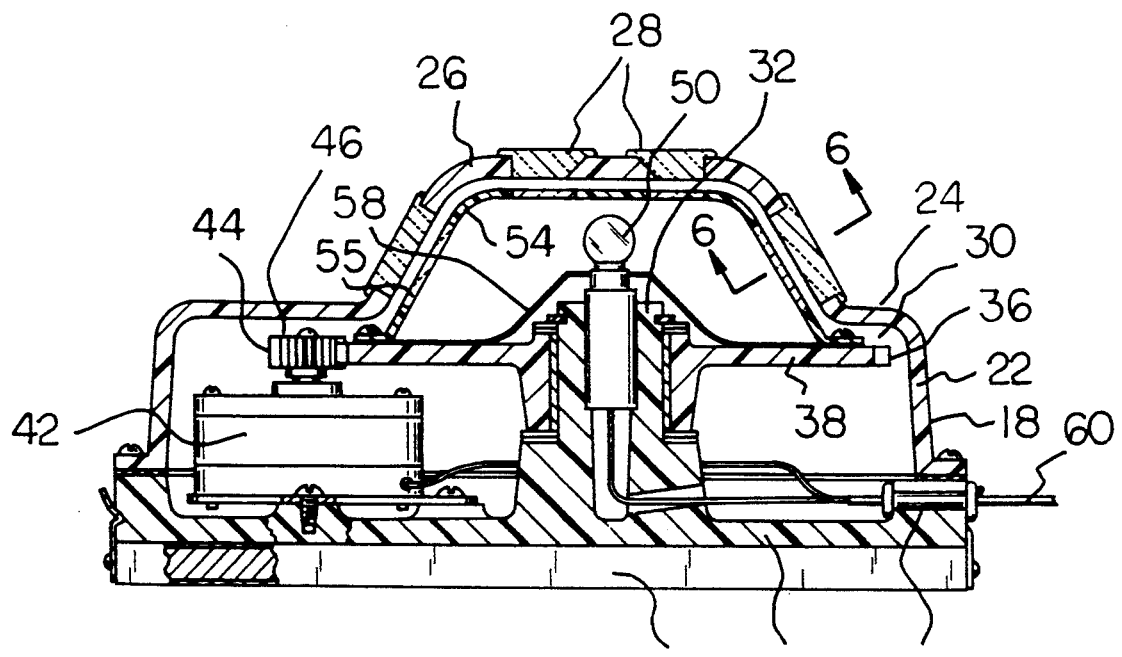
FIG. 4 is a cross-sectional view taken along line 4—4 of FIG. 3.
Figure 5:
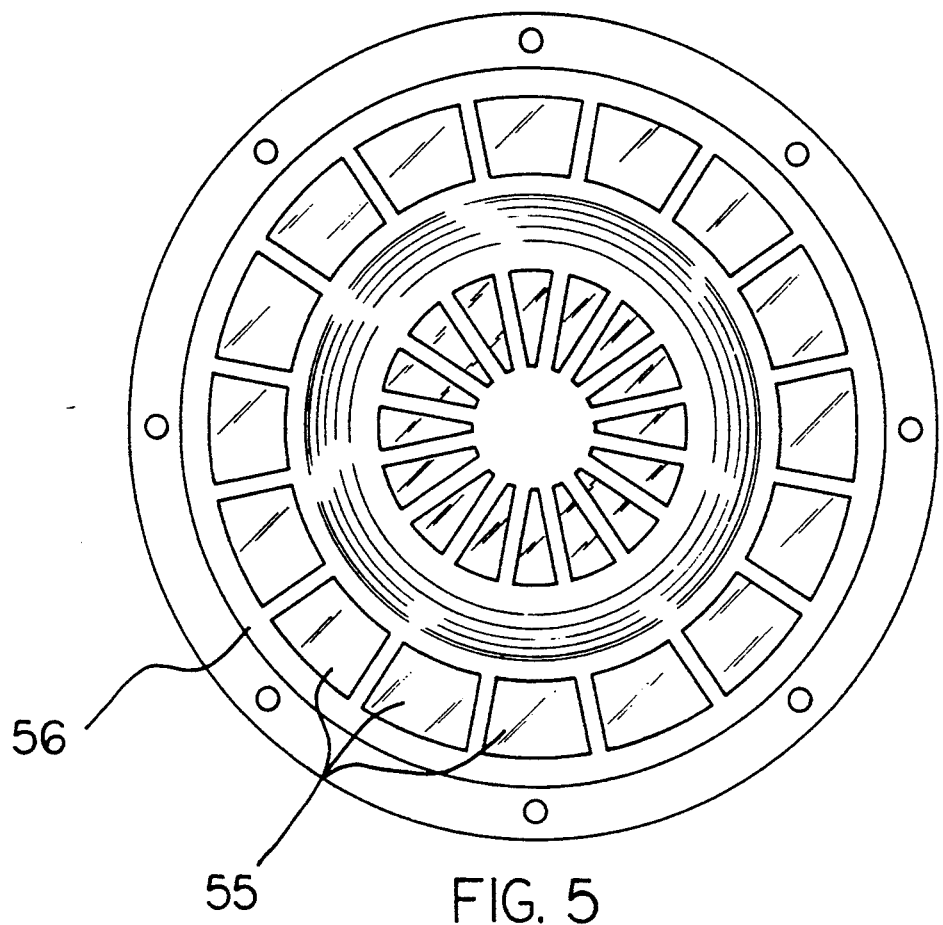
FIG. 5 is a plan view of the filter assembly shown in the prior figure.
Figure 6:
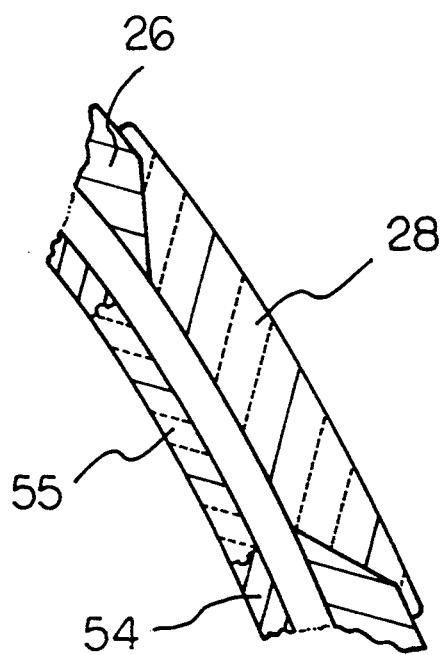
FIG. 6 is a cross-sectional view taken along line 6—6 of FIG. 4.

With reference now to the drawings, and in particular to FIG. 1 thereof, the preferred embodiment of the new and improved submersible device for changing colors in an aquarium embodying the principles and concepts of the present invention and generally designated by the reference numeral 10 will be described.

The present invention, the new and improved submersible device for changing colors in an aquarium is comprised of a plurality of components elements. Such elements, in their broadest context include a base member, housing, a driven gear, a submersible motor, a fixed light source, a domed member and electrical line. Such component elements are specifically configured and correlated with respect to each other to attain the desired objective.

More specifically, the device of the present invention is a system 10. The system includes a base member 12. Such base member is of a rigid construction preferably fabricated of a heavy weighted material. This is to allow placement and retention of the system 10 in the bottom of an aquarium 14.

Secured on the base is a housing 18. The housing has a lower surface 20 coupled to the base. The housing also has an upstanding sidewall 22 and a cover case 24 with a domed-like top 26. The top is formed with clear transparent windows 28 therethrough. Within the housing there is defined a chamber 30. The chamber includes an upwardly extending post 32 at a central extent thereof. The chamber is coaxial with the axis of top.

Next provided is a driven gear 36. The driven gear has a circular extent 38 in a horizontal plane located within the chamber. The driven gear has gear teeth around its periphery. The gear is mounted on the post for rotation with respect to the post during operation and use.

Also located within the chamber is a submersible motor 42. Such motor has a drive gear 44. The drive gear is rotatable about a vertical axis. It also has peripheral teeth 46 which are adapted to be in contact with the teeth of the driven gear. This coupling is for rotating the driven gear and imparting rotation thereto.

Next provided in the system 10 is a fixed light source 50. Such light source is shown as a bulb. It is mounted within the chamber at a location immediately above the post and beneath the dome-like top.

Also located within the chamber is a domed member 54. The domed member is mounted above the driven gear and is coupled thereto for concurrent rotation therewith. The domed member is at a location above the light source but beneath the dome-like top. It is of a configuration to generally conform to the shape of the interior surface of the dome-like top. The domed member is provided with a plurality of transparent plates 55 of varying colors. This is so that light from the source will pass through the plates and then the windows to provide color which varies with the rotation of the horizontal gear and the domed member. Also in association with the horizontal driven gear is a reflector 58. The reflector is again of a generally dome shaped configuration. It is mounted above the driven gear for rotation therewith at a location beneath the light source.

Lastly, the invention includes electrical lines 60. Such lines extend through an aperture 62 in one upstanding sidewall of the housing. The wires have interior ends 64 which are coupled to the motor and to the light source. The electrical lines also have an exterior end 64 adapted to be coupled to a source of potential. Operatively located along the lines at a location exterior of the housing and aquarium is a control member 66. The control member includes a plurality of switches including a rotary switch 67 for turning the source of illumination on and off and varying its intensity. Another switch 68, also preferably a rotary switch is adapted for energizing the motor and effecting its rotation. It is preferred that the rotary switch may vary the power to the motor to thus vary the speed of rotation of the horizontal gear along with the domed member and reflector.

Similar devices have been used to display the same changes of color in flowers, but are to be kept dry. The present invention is completely submersible in fish tanks. You are able to watch the changing colors of the plant while you view the fish in your tank.

The present invention works off an electrical current that runs a small motor for the color turning spectrum wheel. A small light source which illuminates and reflects the colors to the base of the strands of plant life in the tank and creates a visual difference on the plants.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A submersible device for changing colors in an aquarium comprising:
    a base member of a rigid construction and heavy weighted material to allow placement in a bottom of an aquarium;
    a housing having a lower surface coupled to the base with upstanding sidewalls and a cover piece with a dome-like top having a central axis and formed with clear transparent windows therethrough to define a chamber therewithin, the chamber including an upwardly extending post at a central extent thereof coaxial with the axis of the top;
    a driven gear having a circular extent in a horizontal plane within the chamber and having teeth around a periphery thereof, the gear being mounted on the post for rotation with respect thereto;
    a submersible motor mounted within the chamber having a drive gear rotatable about a vertical axis with teeth in contact with the teeth of the driven gear for rotating and imparting rotation to the driven gear;
    a fixed light source mounted within the chamber above the post; and
    a domed member mounted above and to the driven gear for rotation therewith at a location above the light source, the domed member being provided with a plurality of transparent plates of varying colors.

2. The device as set forth in claim 1 and further including:
    electrical lines extending through one said upstanding sidewall having interior ends coupled to the motor and the light source and an exterior end coupled to a source of potential with a control member therebetween, the control member including a rotary switch for the light and a rotary switch for the motor.

3. The device as set forth in claim 1 and further including
    a reflector mounted for rotation with the driven gear beneath the light source.

4. A new and improved submersible device for changing colors in an aquarium comprising, in combination:
    a base member of a rigid construction and heavy weighted material to allow placement in a bottom of an aquarium;
    a housing having a lower surface coupled to the base with upstanding sidewalls and a cover piece with a dome-like top having a central axis and formed with clear transparent windows therethrough to define a chamber therewithin, the chamber including an upwardly extending post at a central extent thereof coaxial with the axis of the top;
    a driven gear having a circular extent in a horizontal plane within the chamber and having teeth around a periphery thereof, the gear being mounted on the post for rotation with respect thereto;
    a submersible motor mounted within the chamber having a drive gear rotatable about a vertical axis with teeth in contact with the teeth of the driven gear for rotating and imparting rotation to the driven gear;
    a fixed light source mounted within the chamber above the post;
    a domed member mounted above and to the driven gear for rotation therewith at a location above the light source, the domed member being provided with a plurality of transparent plates of varying colors and with a reflector mounted for rotation with the driven gear beneath the light source; and
    electrical lines extending through one upstanding sidewall having interior ends coupled to the motor and the light source and an exterior end coupled to a source of potential with a control member therebetween, the control member including a rotary switch for the light and a rotary switch for the motor.

* * * * *